United States Patent [19]
Scheier et al.

[11] Patent Number: 5,183,434
[45] Date of Patent: Feb. 2, 1993

[54] METHOD AND APPARATUS FOR REMOVING THE SKIN FROM POULTRY CARCASSES

[75] Inventors: Donald J. Scheier, Kansas City, Mo.; Jack L. Hathorn, Springdale, Ark.

[73] Assignee: Johnson Food Equipment, Inc., Kansas City, Kans.

[21] Appl. No.: 725,181

[22] Filed: Jul. 3, 1991

[51] Int. Cl.$^5$ .............................................. A22B 5/16
[52] U.S. Cl. ................................. 452/131; 452/140; 452/169
[58] Field of Search ............... 452/131, 125, 127, 135, 452/165, 169, 140

[56] References Cited

U.S. PATENT DOCUMENTS

| | | | |
|---|---|---|---|
| 306,148 | 10/1884 | Gray | 426/482 |
| 537,215 | 4/1955 | Mead | 452/131 |
| 561,021 | 5/1896 | McCausland | 452/132 |
| 1,263,636 | 4/1918 | Armaugh | 452/131 |
| 1,377,872 | 5/1921 | Callery | 452/131 |
| 1,764,425 | 6/1930 | Thomas | 452/131 |
| 1,822,375 | 9/1931 | Ryder | 452/131 |
| 2,851,362 | 9/1958 | Goldberg | 452/131 |
| 3,478,385 | 11/1969 | Kaplan | 452/131 |
| 3,722,032 | 2/1973 | Draper et al. | 452/140 |
| 3,930,282 | 1/1976 | Martin et al. | 452/125 |
| 4,118,830 | 10/1978 | Weiland | 452/131 |
| 4,184,229 | 1/1980 | Soran | 452/116 |
| 4,226,005 | 10/1980 | Myers | 452/125 |
| 4,562,613 | 1/1986 | Lewis | 452/169 |
| 4,597,136 | 7/1986 | Halenbroek | 452/169 |
| 4,765,030 | 8/1988 | Dubowik | 452/131 |

FOREIGN PATENT DOCUMENTS 2014081 10/1990 Canada .

*Primary Examiner*—Willis Little
*Attorney, Agent, or Firm*—Hovey, Williams, Timmons & Collins

[57] ABSTRACT

The machine employs a plurality of individual, pointed mandrels that are attached to a closed loop conveyor having an upper processing run and a lower return run. As the mandrels move along the upper run, they are periodically reoriented into a number of successive positions so that skin removal operations can be performed on carcasses that have been impaled on the mandrels by workers stationed at the loading end of the machine. At a first station the wings are severed from each successive carcass in an upright position with special movement of the cutters being effected to prevent overly deep cutting into the breast meat. As the carcass approaches a second station with the back up and the posterior end leading, a slit is made in the back skin down the full length of the backbone by a slitting nozzle that injects air under the back skin while it is inserted between the back skin and the meat therebeneath. As the carcass passes through a third station with the breast up and the anterior end leading, a slit is made in the breast skin down the full length of the breast skin by another slitting nozzle which injects air under the breast skin as it slips between the skin and the breast meat. Subsequently, the carcass passes through a peeling station where rods engage and pull the two loosened halves of skin down toward the legs on the upright carcass, whereupon the skin halves may be manually pulled down over the legs and off the carcass to also strip the leg skin from the carcass. Thereafter, the completely skinned carcasses are automatically ejected from the machine before the mandrels start their lower return run.

43 Claims, 9 Drawing Sheets

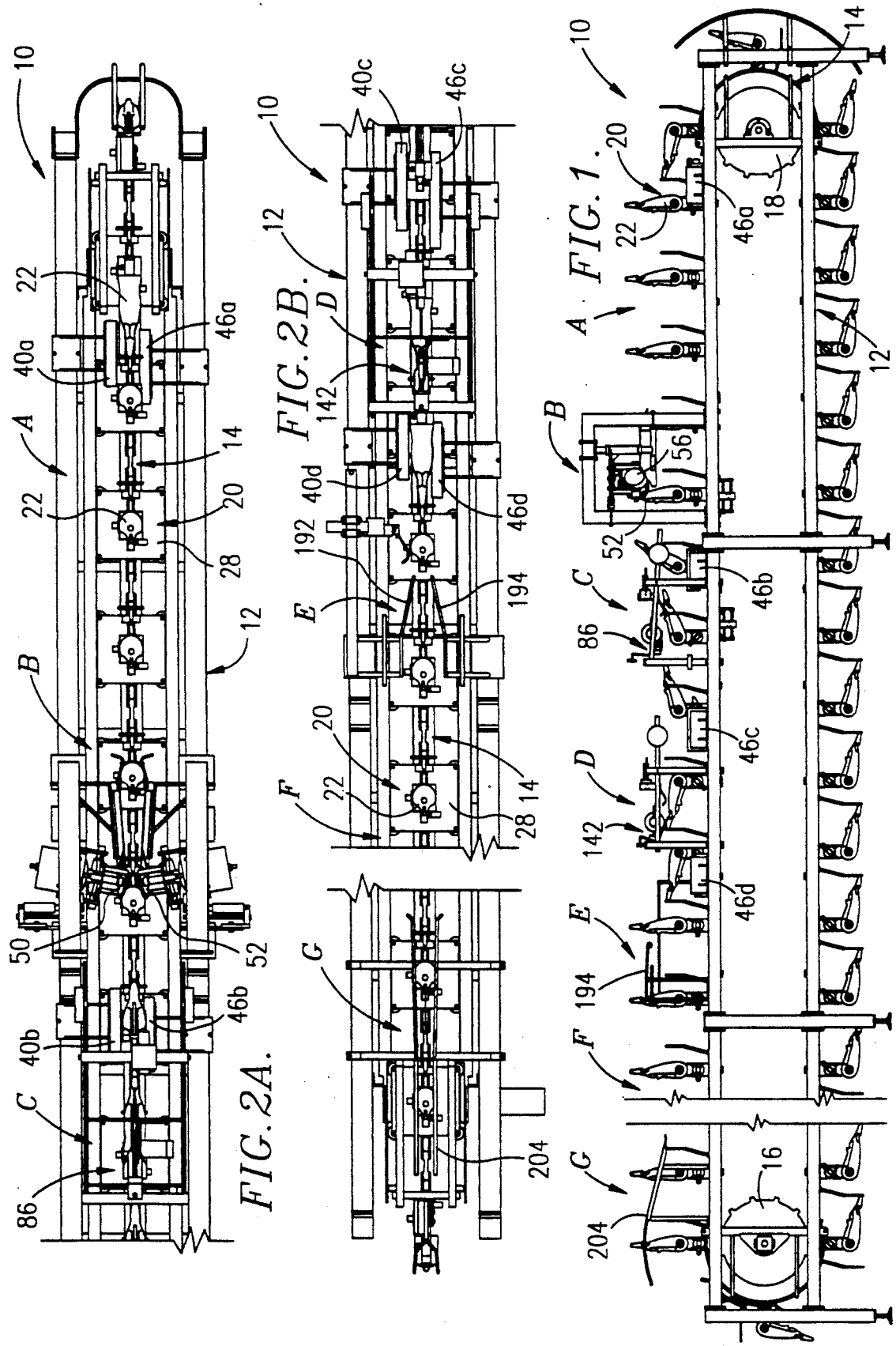

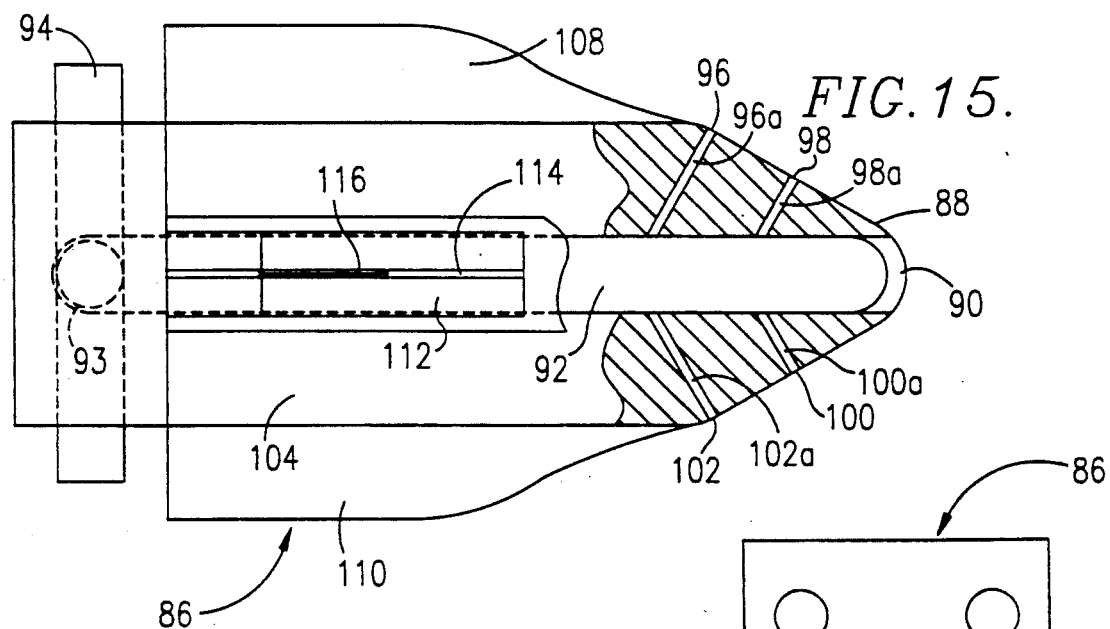
FIG. 15.
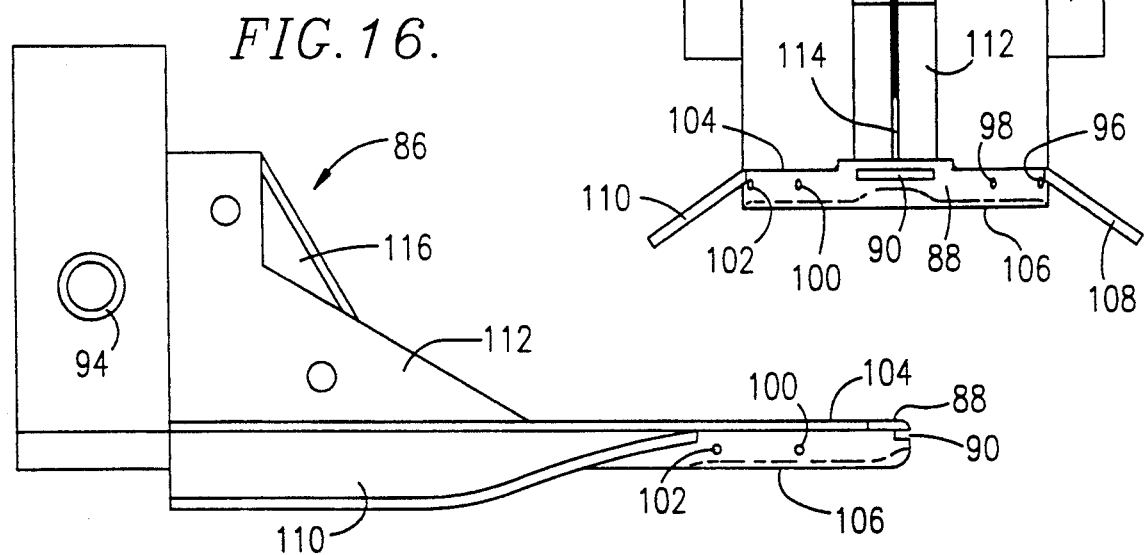
FIG. 17.
FIG. 16.
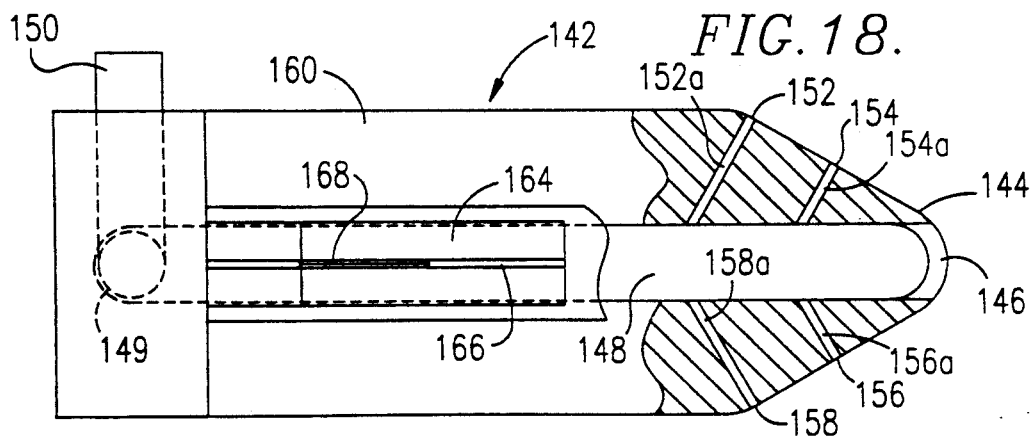
FIG. 18.

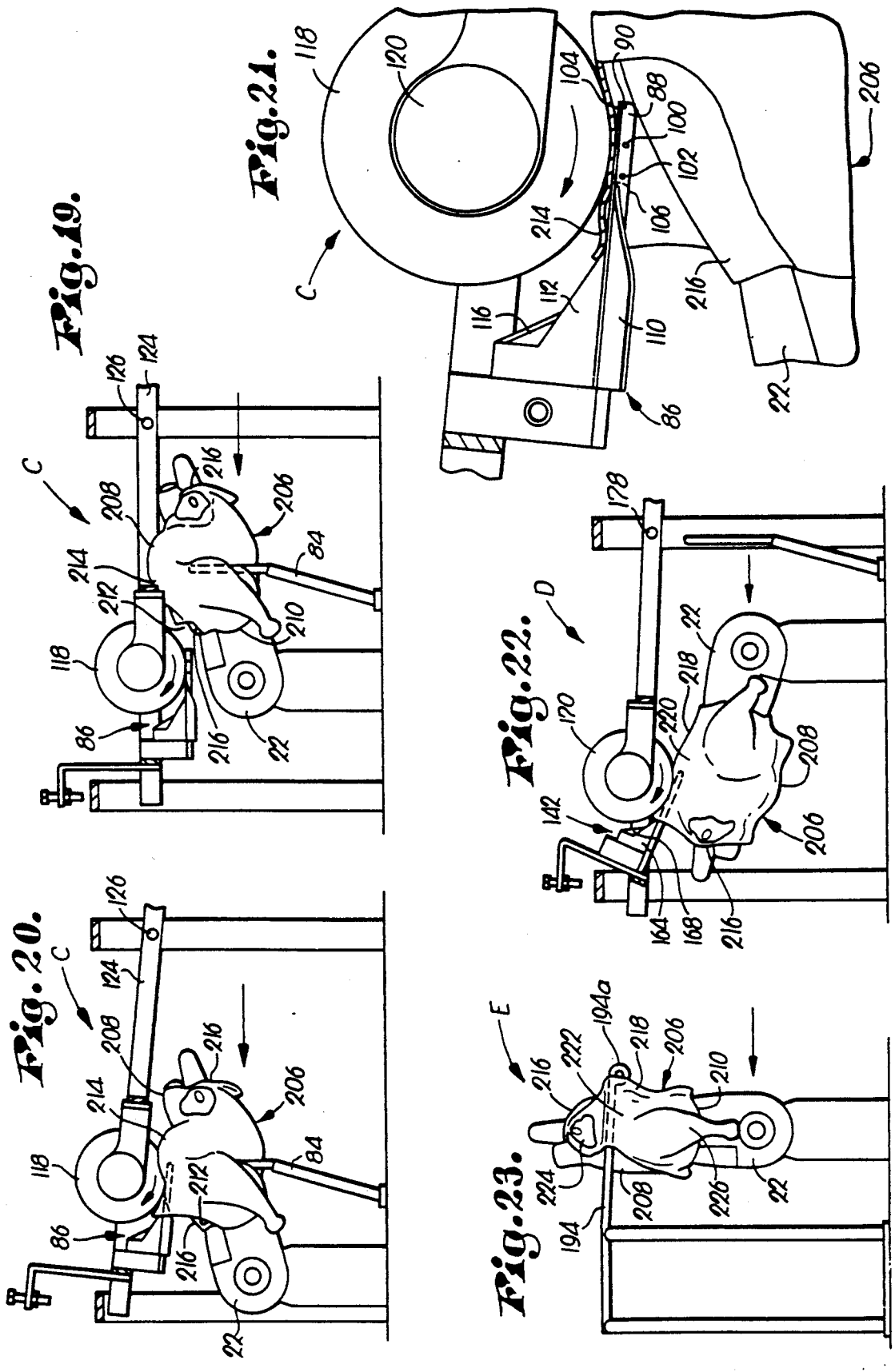

METHOD AND APPARATUS FOR REMOVING THE SKIN FROM POULTRY CARCASSES

TECHNICAL FIELD

The present invention relates to the processing of poultry and, more particularly, to a method and apparatus useful for skinning poultry carcasses at high conveyor speeds typically found in poultry processing plants.

BACKGROUND AND SUMMARY

Poultry carcasses have heretofore sometimes been skinned by hand to remove the fatty skin layer so that only the leaner flesh remains. However, to our knowledge no mechanical systems have heretofore been invented to remove the skin mechanically in a manner that is compatible with line speeds typically found in modern poultry processing plants.

The present invention contemplates first completely removing the wings from the carcass so that the trunk and both legs are left on the carcass. Either before or after the wing removal, the tail is also removed, leaving a small patch of exposed flesh at the posterior end of the carcass. The exposed patch at the posterior of the carcass facilitates the insertion of an air nozzle that slips under the skin just above the meat so that a stream of high pressure air from the nozzle may force the skin away from the meat as the skin tends to be inflated by the nozzle. As the nozzle is moved along the backbone under the skin, a knife associated with the nozzle slits the skin all along the backbone, whereupon the carcass is turned end-for-end and is presented to a second stationary nozzle along the conveyor line which is inserted under the breast skin of the carcass. As the second nozzle continues to be forced under the skin along the breast bone, a second air stream tends to once again inflate and pull the skin away from the meat, while another knife associated with the second nozzle slits the breast skin along the full length of the breast so that, by this time, two complete half sheets of skin are presented. Thereupon, the carcass is presented to stationary peeling rods which are disposed in parallel alignment with the path of travel of the conveyor and slip under the two halves of skin in such a manner as to force them to pull away from the sides of the carcass generally down toward the legs such that the trunk of the carcass is wholly peeled free of skin down to the legs. At that point, the skin may be grasped manually or by suitable mechanical means and pulled down and over the legs to leave the carcass entirely skin-free.

The carcasses are mounted on special mandrels which preferably take the form of those disclosed in Canadian patent application 2,014,081 filed Apr. 6, 1990, titled "Poultry Processing Apparatus and Method" and filed in the names of Rudolph J. Tieleman, et al. Such mandrels comprise elongated, tapering bodies that stand in an upright condition during a portion of their travel along a predetermined conveying line so that the carcasses may be manually loaded onto the mandrels as the mandrels are inserted up into the body cavities of the carcasses. Stationary cam mechanisms along the path of travel of the mandrels interact with operating mechanisms to maintain the mandrels in upright positions during part of their movement along the path of travel, rotate them into reclining positions with the posterior ends leading during another part of the path of travel, and rotate them into prone positions with the anterior ends leading during other portions of the path of travel. After each carcass has first been placed on one of the mandrels in an upright position, the carcass passes through a wing cutting station in which both wings are completely severed from the carcass. Inwardly inclined cutting discs situated on opposite sides of the path of travel of the carcass start severance of the wings at one certain angular position but are swung slightly outwardly away from the path of travel as the carcass continues to move and severance progresses so that the angle cutters will not slice deeply into the breast of the carcass.

After passing through the wing cutting station, each mandrel is cammed into its reclining position to present the carcass posterior end first and back up to a back skin slitting station which loosens the skin along the backbone of the carcass and makes a complete slit from the tail area of the carcass up to the neck region along the backbone. A plurality of air streams are directed under the back skin at this station to facilitate the loosening and slitting process, including one or more streams issuing from a generally flat, pointed, stationary nozzle that is centered in the path of travel of the carcass in such a manner as to slip under the back skin directly above the tail region and along the backbone. A rotary drive wheel which directly overlies the flat nozzle near its tip engages the outside of the back skin as the nozzle enters the skin so as to force the skin to climb up onto the nozzle and thereby assure proper penetration of the nozzle tip under the skin and along the backbone. As the skin climbs up onto the nozzle and the nozzle moves along the backbone, a centrally positioned knife blade slits the skin to facilitate its subsequent removal from the carcass.

Upon leaving the back skin slitting station the mandrel on which the carcass is impaled is cammed 180° into a prone position with the breast up and the anterior end of the carcass leading. In that orientation the carcass moves through a breast skin slitting station in which a second nozzle, similar to that used at the back skin slitting station, slips under the breast skin near the neck portion of the carcass as streams of air are directed under the breast skin to loosen and inflate the skin to facilitate entry of the nozzle. A second rotary drive wheel immediately overlying the breast nozzle adjacent its tip end serves to drive the breast skin up onto the nozzle in a manner similar to that which occurred with the back skin. Continued advancement of the carcass in the breast up position causes the nozzle to be moved relatively along the breast bone from the neck end to the tail region of the carcass, producing a continuous slit from a knife blade associated with the breast nozzle.

After passage through the breast skin slitting station the mandrel carrying the carcass is cammed 90° into an upright position with the neck region of the carcass facing upwardly and the tail region facing downwardly. As the carcass moves through the peeling station in this position, air is directed at the two halves of skin on opposite sides of the carcass to help billow out the skin and facilitate entry of two separate, individual peeling rods located on opposite sides of the path of travel in horizontal attitudes. The two rods converge at their upstream ends to be spaced apart a distance corresponding to the width of the carcass so that the leading tips of the rods slip under the skin halves at approximately their vertical midpoints. Continued advancement of the carcass coupled with diverging orientation of the rods causes the skin halves to be progressively peeled from the carcass adjacent the upper and lower areas of connection until the two opposite skin halves are totally disconnected from the meat down to an area immediately adjacent the legs. At that point an operator may manually grip the skin halves and pull them downwardly off the carcass to complete the total skinning process or they may be removed by suitable mechanical means, whereupon the skinned carcass may be removed from the machine.

BRIEF DESCRIPTION OF THE DRAWINGS

FIG. 1 is a side elevational view of a poultry skinning machine constructed in accordance with the principles of the present invention and capable of carrying out our novel method, an intermediate portion of the machine adjacent the discharge end being removed for purposes of illustrating the machine at an acceptable scale;

FIG. 2A is a fragmentary, top plan view of the machine of FIG. 1 commencing with the carcass loading end of the machine and continuing to a point just beyond the back skin slitting station;

FIG. 2B is also a top plan view of the machine of FIG. 1 continuing from the point where FIG. 2A leaves off onto the discharge end of the machine, a portion of the machine following the peeling station and just prior to the discharge being removed for reasons of scale;

FIG. 15 is an enlarged, fragmentary top plan view of the slitting nozzle associated with the back slitting station, the front portion of the nozzle body being broken away to reveal details of construction;

FIG. 16 is a side elevational view of the slitting nozzle of FIG. 15;

FIG. 17 is a front elevational view of the slitting nozzle of FIG. 15;

FIG. 18 is an enlarged, top plan view of the slitting nozzle associated with the breast skin slitting station, the tip portion being broken away to reveal details of construction;

FIG. 19 is a schematic, fragmentary side elevational view of the back skin slitting station with certain structures removed for clarity and showing the orientation of the poultry carcass as it approaches the back skin slitting nozzle;

FIG. 20 is a schematic, side elevational view of the back skin slitting station similar to FIG. 19 illustrating the manner in which the slitting nozzle slips under the back skin at the beginning of the slitting process;

FIG. 21 is an enlarged, fragmentary view of the back skin slitter in the position of FIG. 20 showing a portion of the back skin fragmentarily broken away to illustrate the manner in which the tip of the nozzle slips between the back skin and the underlying meat of the carcass;

FIG. 22 is a schematic, fragmentary side elevational view of the breast skin slitting station with structural portions removed for clarity and illustrating the orientation of the carcass as the breast skin slitting nozzle slips between the breast skin and the underlying meat of the carcass; and FIG. 23 is a schematic, fragmentary side elevational view of the peeling station with structural portions removed for clarity and illustrating the orientation of the carcass as the peeling rods strip the two halves of loosened skin from opposite sides of the carcass.

DETAILED DESCRIPTION

Figure 4:
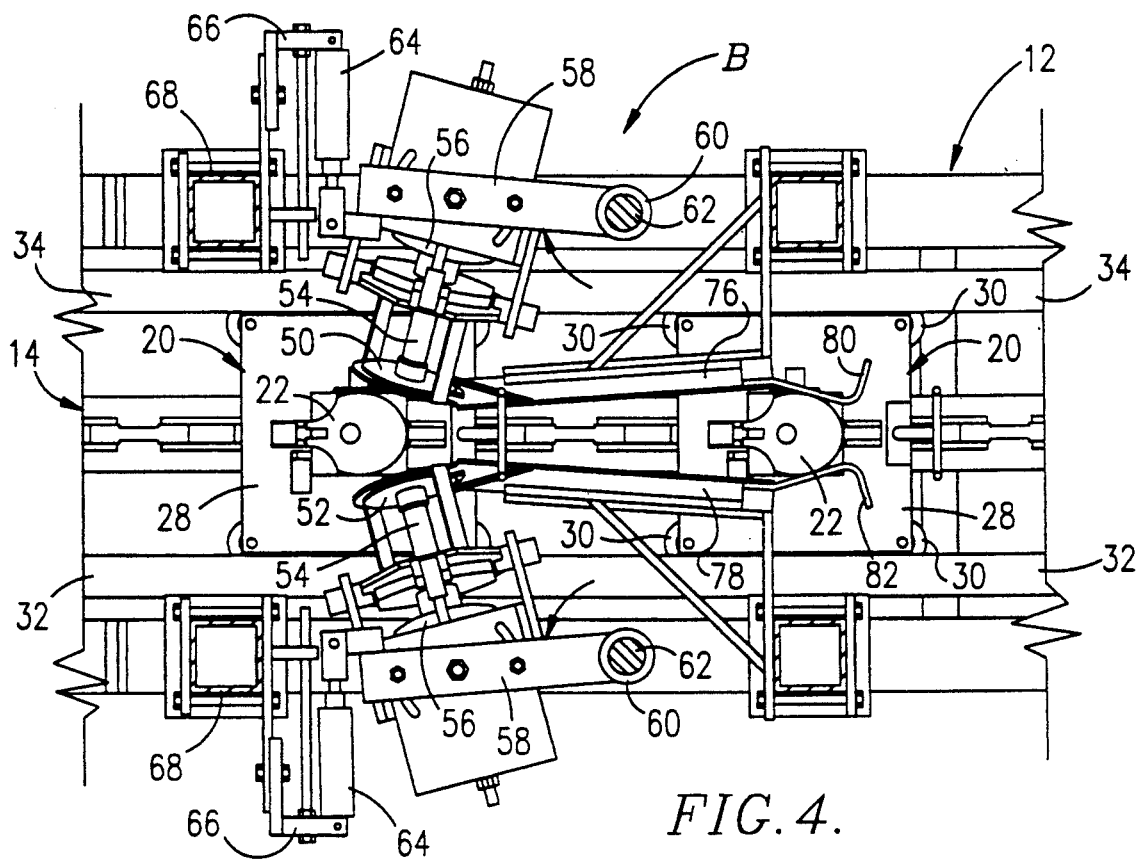
FIG. 4 is a fragmentary, top plan view of the wing cutting station similar to FIG. 3, but showing the cutters swung slightly outwardly away from their FIG. 3 positions for completing the remainder of the wing cut without slicing into the breast meat on the carcass.
Figure 3:
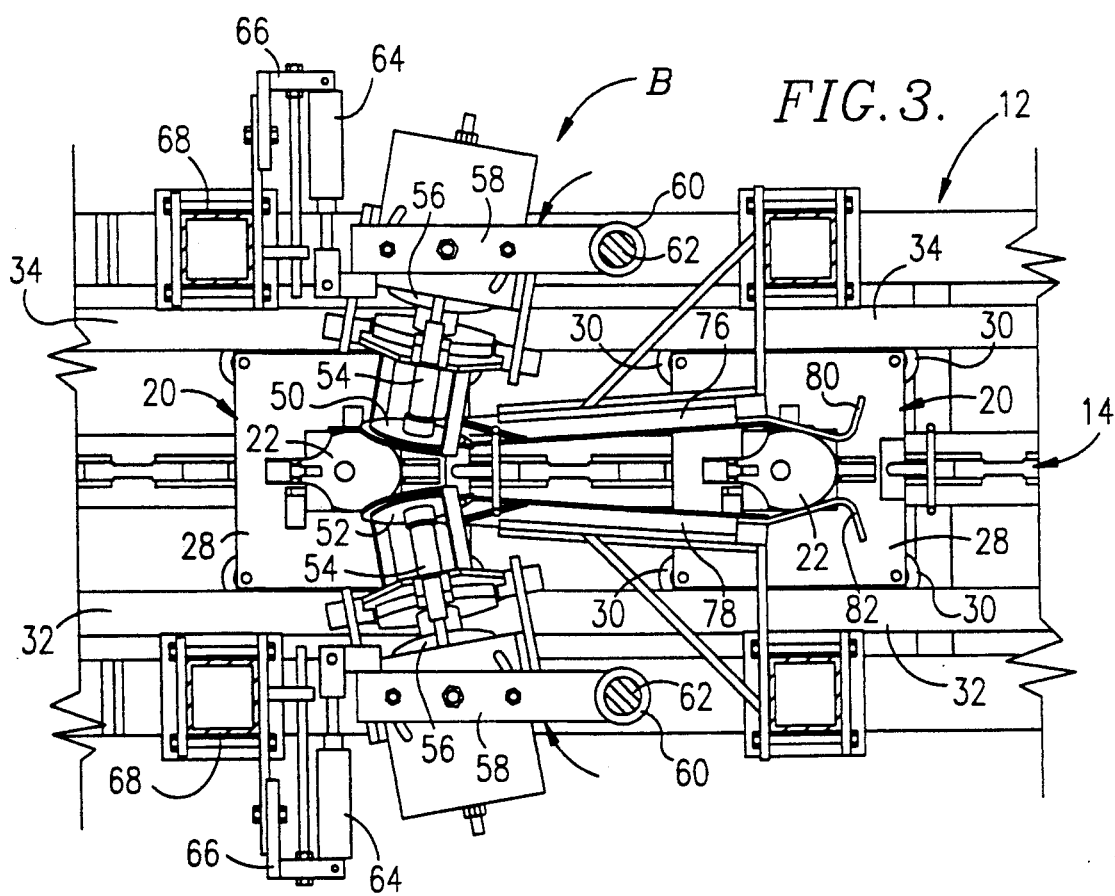
FIG. 3 is an enlarged, fragmentary top plan view of the wing cutting station of the machine with portions of the supporting framework for the cutters shown in cross-section and illustrating the two circular cutting blades at their inward positions for making the initial portion of wing severance.

As illustrated in FIGS. 1, 2A and 2B, the machine 10 in accordance with the present invention broadly comprises an elongated, free-standing frame 12 having an endless conveyor 14 looped around upright sprockets 16 and 18 at opposite ends of the frame 12 for presenting the conveyor 14 with upper and lower horizontal runs. The conveyor 14 is driven in such a manner that its upper run moves from right to left, viewing FIG. 1, along which stretch all of the skinning operations associated with the present invention are carried out.

The conveyor 14 is provided with a series of carrier assemblies 20 attached thereto for movement therewith. Such carrier assemblies 20 are similar in most respects to the carrier assemblies disclosed in the aforementioned Canadian patent application 2,014,081 of Tieleman, et al., and said application is incorporated herein by reference for a full and complete understanding of the nature and operation of the carrier assemblies 20. Although the carrier assemblies in the Tieleman application are mounted on a machine which defines a flat, rectangular path of travel instead of the upright loop contemplated by the present invention, it will be seen that mandrels 22 of the carrier assemblies 20 are preferably virtually identical to the mandrels of the carrier assemblies in the Tieleman application and are operated between upright, prone and reclining positions in substantially the same manner as the mandrels in the Tieleman machine.

As perhaps shown best in FIGS. 3, 4, 5, 6, and 9, each mandrel 22 is mounted at its lower end on a transverse pivot 24 (FIG. 5) which secures the mandrel to a pedestal 26 rising from a flat, horizontally extending carrier plate 28. The rectangular carrier plate 28 has a set of horizontal roller wheels 30 at its four corners which travel within horizontal guide tracks 32 and 34 (FIG. 6) on opposite sides of the horizontal path of travel of the conveyor.

Figure 8:
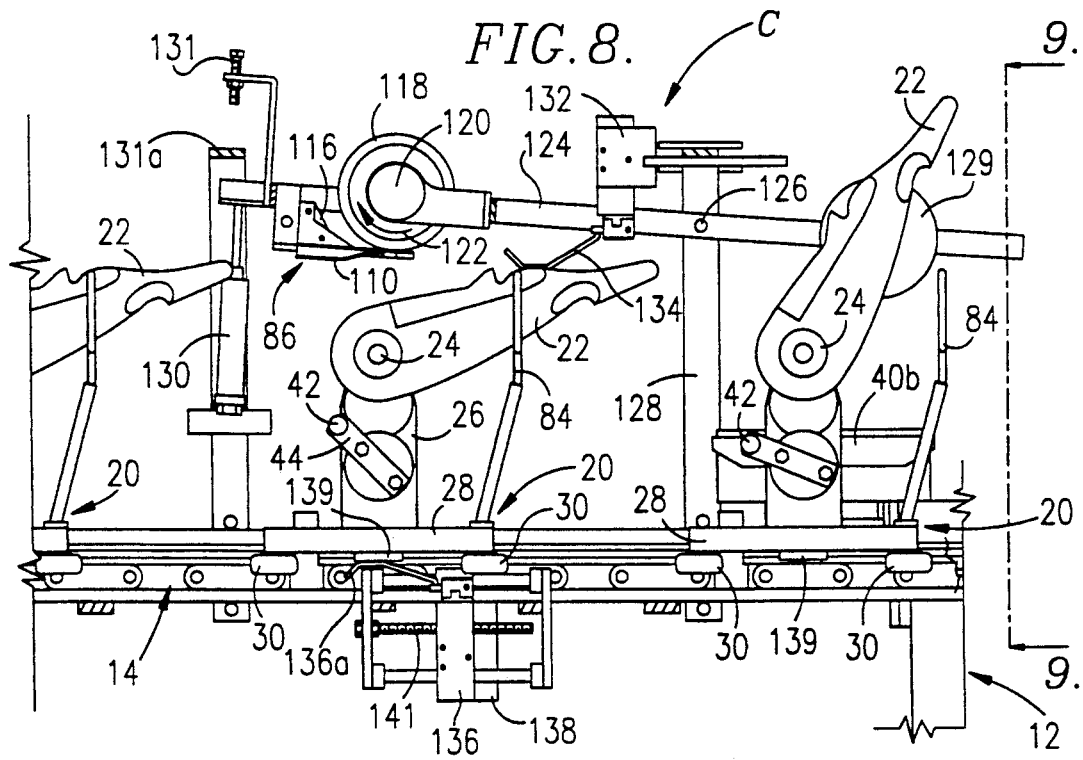
FIG. 8 is an enlarged, fragmentary elevational view of the back skin slitting position taken from the same side of the machine as illustrated in FIG. 1.
Figure 11:
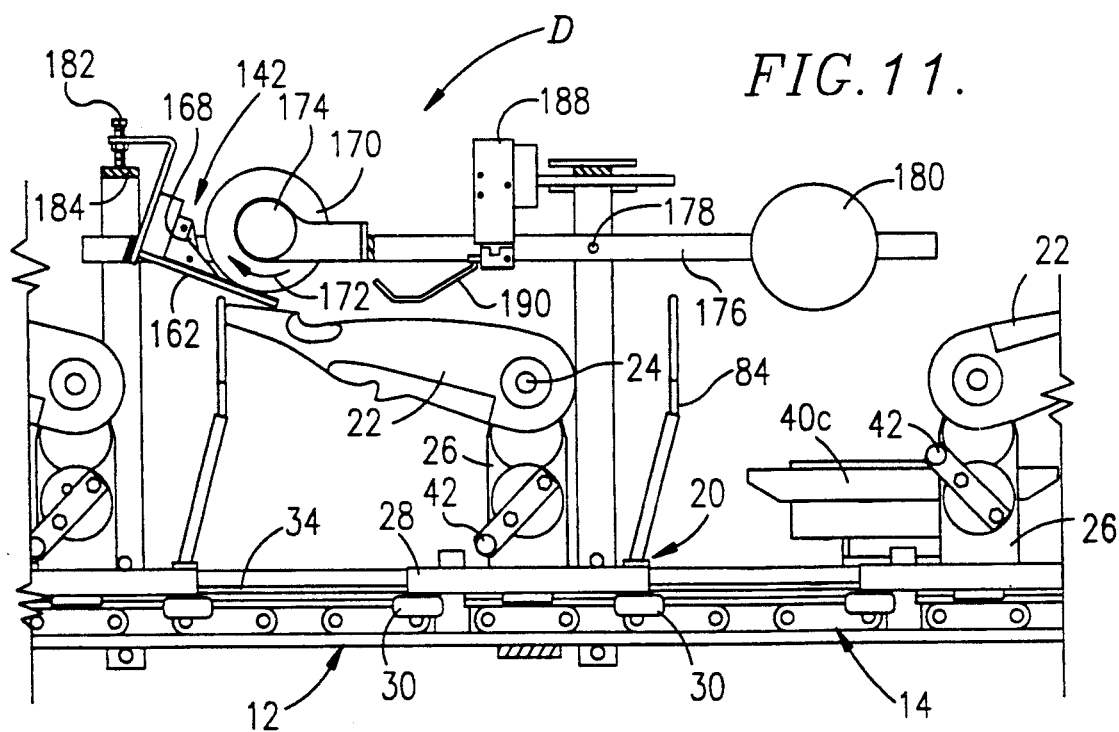
FIG. 11 is an enlarged, fragmentary side elevational view of the breast skin slitting station viewed from the same side of the machine as illustrated in FIG. 1.
Figure 12:
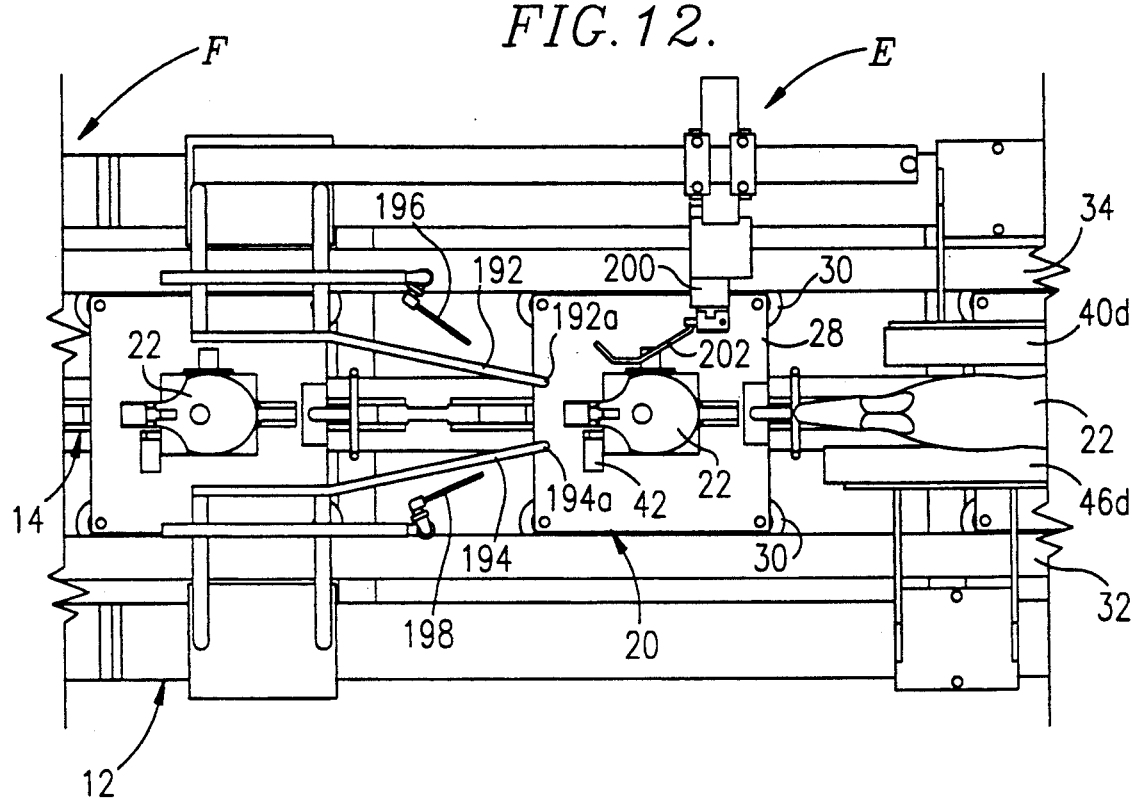
FIG. 12 is an enlarged, fragmentary top plan view of the peeling station of the machine.

As a result of the pivot 24, mandrel 22 can be rocked between a reclining position as illustrated, for example, in FIG. 8 in which the tip of the mandrel 22 trails the mounted end of the mandrel as the conveyor advances, and a prone position as illustrated, for example, in FIG. 11 in which the tip of the mandrel leads the mounted end. As will hereinafter be explained in further detail, the reclined position corresponding to FIG. 8 positions the carcass with its back up for the back skin slitting operation, while the prone position of FIG. 11 positions the carcass with its breast up for the breast skin slitting operation. An intermediate upright position, shown in FIG. 5, is also used for the carcasses during the wing cutting and peeling steps of the process.

It is to be understood that when the mandrel is in its upright position, its reclined position, or its prone position, it is locked releasably in that orientation by mechanism not illustrated herein but disclosed fully in the incorporated Canadian application 2,014,081 of Tieleman, et al. Such latching mechanism generally includes a vertically reciprocable tang (not shown) housed within the pedestal 26 and operable when extended upwardly beyond the pedestal 26 to enter into an aligned receiving hole in the curved bottom of the mandrel 22. One of such holes 36 corresponding to the prone position is illustrated, for example, in FIG. 6, it being understood there is an additional such hole spaced approximately 90° from hole 36 corresponding to the upright position of the mandrel 22 and yet another such hole spaced approximately 150° to 180° from the hole 36 and corresponding to the prone position of the mandrel 22. The position of the latching tang is controlled by a laterally projecting actuator 38 which extends from one side of the pedestal 26, as illustrated for example in FIGS. 6 and 9, and is disposed for operating engagement from time-to-time with cam structure 40 (FIGS. 9, 10, and for example) situated along the path of travel of the mandrel for releasing and locking the latch mechanism. As illustrated in FIGS. 2A and 2B, the cam structure 40 actually includes four separate structures 40a, 40b, 40c, and 40d spaced along the path of travel of the conveyor 14 for releasing the mandrels during reorientation thereof. At the first structure 40a, the latch is released to allow the mandrels to be swung to their upright positions after coming around the sprocket 18 so the mandrels will be in proper position for loading of the carcasses thereon. At the second cam structure 40b, the latch is released to permit the mandrel to be cammed back into its reclined position for back skin slitting. At structure 40c, the latch is released to permit repositioning of the mandrel into its prone position for breast skin slitting, and at structure 40d, the latch is released to permit the mandrel to be returned to an upright position for peel down of the skin and subsequent discharge of the carcass.

Figure 5:
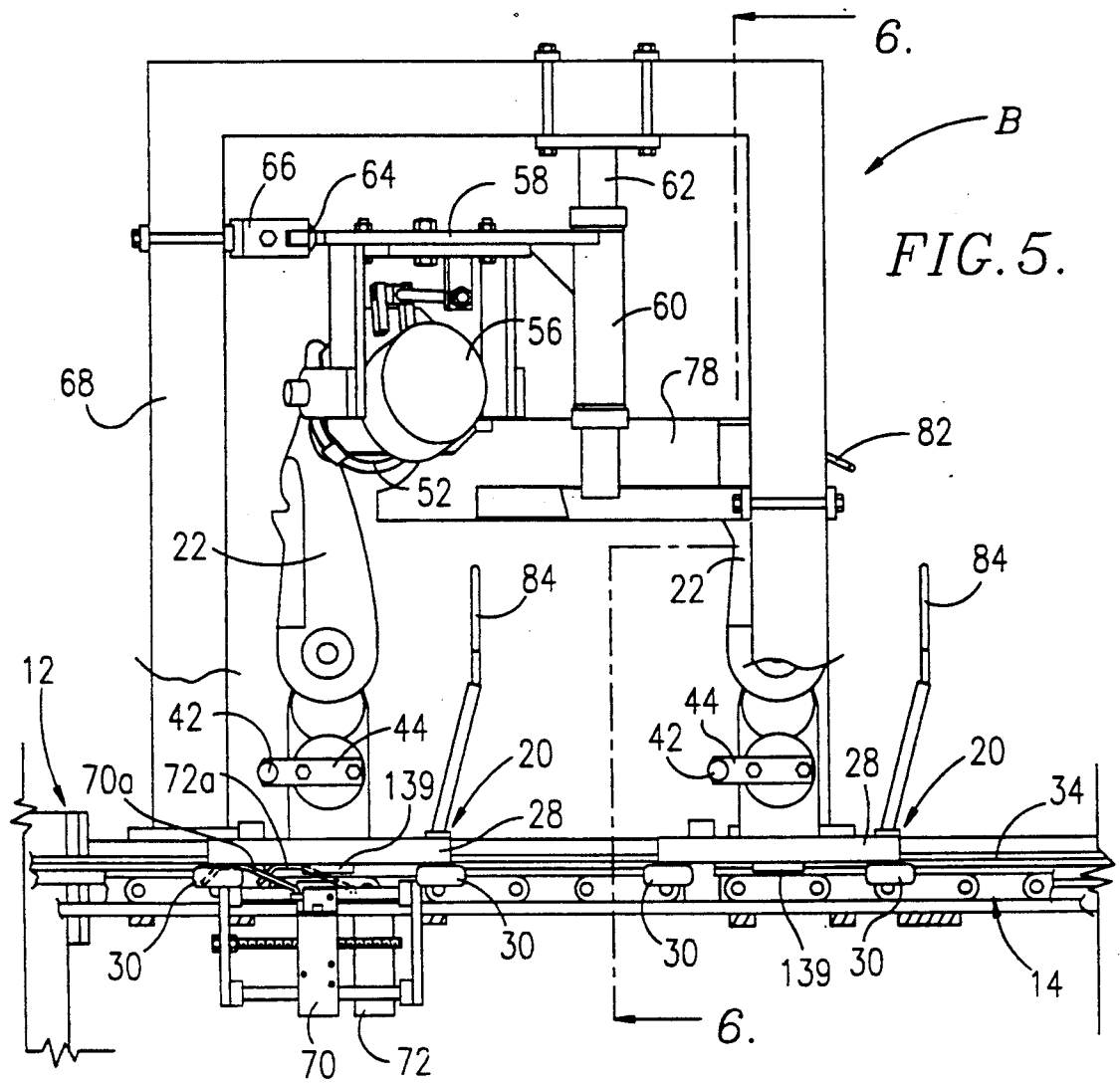
FIG. 5 is an enlarged, fragmentary, side elevational view of the wing cutting station of the machine viewed from the same side of the machine as illustrated in FIG. 1 with the mandrels moving from right to left.

With respect to manipulating the mandrels 22 between their various orientations, each pedestal 26 is provided with operating mechanism that includes a cam follower 42 on a crank 44 as shown, for example, in FIG. 5. Although in the Canadian patent application, the operating mechanism takes the form of pivoting linkages coupled with a cam-following roller such as the roller 42 in the present invention, in the present machine such linkages have been replaced with a gear train housed within the pedestal 26 while being meshed at one end with a drive gear (not shown) on the lower end of the mandrel 22 and operated by the crank 44 at the opposite end of the gear train. Cam means 46 for engaging and operating the follower 42 and crank 44 is disposed alongside the path of travel of the conveyor 14 on the side opposite the cam structure 40. As illustrated particularly in plan in FIGS. 2A and 2B, the cam means 46 includes a first cam 46a adjacent the latch actuator 40a, a second cam 46b adjacent the latch actuator 40b, a third cam 46c opposite the actuator 40c, and a fourth cam 46d opposite the latch actuator 40d. Inasmuch as the cam operators 46 are essentially directly opposed to the latching cams 40 (although there is a slight offset of the operating cams 46 in a downstream direction form the latch cams 40), the latch cams 40 function to periodically release the modules 22 for reorientation during which release time the operating cams 46 function to quickly swing the mandrels from an existing position into a new orientation. Thereafter, as the mandrel moves beyond the particular latch cam 40, the locking tang is released to reengage in the receiving hole 36 within the mandrel bottom to retain the mandrel in the new orientation.

As illustrated in overview form in FIGS. 1 and 2, the machine 10 contemplates a number of different stations along its length where operations occur on the poultry carcasses. The first of such stations may be described as a loading station broadly denoted by the letter A and located a short distance downstream from the right end of the machine as FIG. 1 is viewed. At loading station A the mandrels 22 are disposed in an upright position for having a carcass thrust down onto the mandrel with the latter projecting up into the body cavity of the carcass, essentially impaling the carcass to retain it in place.

The second station is a wing cutting station broadly denoted by the letter B where the two wings are removed from the carcass. Station B is just a short distance downstream from the loading station A and the carcasses remain in an upright attitude as they move through the wing cutting station B.

The third station is the back skin slitting station C where the back skin of the carcass is slit from the tail region to the neck area. Next is the breast skin slitting station D where the breast skin is slit along the full length of the breast bone to essentially produce two separate half sheets of skin on opposite sides of the carcass.

After the breast skin slitting station D, the carcasses pass through the peeling station E where the half sheets of skin are actually peeled down to the legs, whereafter the carcasses pass through a final peeling station F where the peeled down skin may be manually grasped by an operator stationed beside the machine and peeled the rest of the way off the legs and completely free of the carcass. As unloading station G at the left end of the machine mechanically removes the skinned carcasses from their mandrels for gravitation into suitable collecting means not shown.

Loading Station

As earlier mentioned, as the mandrels 22 pass through the loading station A they have already been raised to an upright position by virtue of the latch releasing cam 40a and the operating cam 46a. Upon leaving the cams 40a and 46a, the mandrels 22 are locked into their upright position and remain in such a condition until being shifted into a reclining position just prior to station C.

Depending upon the line speed, it may or may not be necessary to have several operators available to manually load carcasses on the mandrels 22 at the loading station A. Of course, the machine 10 may be lengthened in the area of the loading station A to the extent necessary to accommodate the desired number of operators at that location.

Wing Cutting Station

Each carcass is positioned on its mandrel 22 in such a way that the wings of the carcass are situated on opposite sides of the path of travel of the conveyor 14. Thus, at station B, a pair of rotary disc cutters 50 and 52 are positioned on opposite sides of the path of travel of the conveyor for completely severing the wings from the carcass. The two cutters 50,52 (FIGS. 3, 4, 5, and 6) are disposed at oblique angles to the path of travel of the carcass such that the two cutters 50,52 converge toward one another in an upstream direction and are rotatable about respective axes that project transversely inwardly and slightly rearwardly and downwardly. Each cutter 50,52 is affixed to the outer end of a output shaft 54 associated with a high speed rotary motor 56. Each motor 56 is suspended from a subframe 58 having an upright sleeve 60 (FIGS. 3, 4, and 5) at its inner end that is rotatably received on an upright post 62 above and alongside of the conveyor 14. Although each post 62 is stationary, each subframe 58 mounted thereon is slightly swingable toward and away from the conveyor 14 by virtue of the mounting sleeve 60 and a pneumatic cylinder 64 which interconnects the distal end of the subframe 58 and a stationary bracket 66 on an auxiliary frame tower 68 supported by and rising upwardly from the main frame 12. When the pneumatic cylinders 64 are in their extended positions, as in FIG. 3, the subframes 58 are held in their inward positions of FIG. 3 so that the cutters 50,52 are positioned for initiating the wing cut. On the other hand, when the pneumatic cylinders 64 are retracted as in FIG. 4, the subframes 58 are swung outwardly from their FIG. 3 positions, correspondingly swinging the cutters 50,52 slightly outwardly so that the carcass-engaging peripheries of the cutters 50,52 are not quite as close to the breast of the carcass as in the FIG. 3 position.

Actuation of the pneumatic cylinders 64 is controlled by a pair of stationary control valves 70 and 72 (FIG. 5) located under the wing cutting station B beneath the path of travel of the carrier plates 28 associated with each mandrel 22. The valves 70 and 72 have feelers 70a and 72a respectively that are positioned for operating engagement with the bottom of the carrier plate 28. When the feelers 70a and 72a are out of engagement with the bottom of a carrier plate 28, the valves 70 and 72 cause the cylinders 64 to be extended, thus holding the cutters 50,52 in their inward position of FIG. 3. On the other hand, during the time the feelers 70a,72a are engaged by the bottom of a carrier plate 28, the valves 70,72 cause the cylinder 64 to be in retracted conditions, holding the cutters 50,52 in their outward position of FIG. 4.

Also associated with the wing cutting station B but upstream from the cutters 50,52 are wing guide rails 76 and 78 comprising generally flat, upwardly and inwardly converging plates disposed at such a position as to slip under the wings of the carcass and help guide the same into position for severance by the cutters 50,52 when the carcass reaches that position. The rails 76,78 diverge in an upstream direction until their upstream terminal ends are reached, at which point a pair of guide rods 80 and 82 project in the upstream direction in a slightly downwardly, converging manner to receive the main trunk portion of the carcass as it approaches the wing cutting station B. Each of the guide rods 80,82 is outturned at its upstreammost end to facilitate slipping under the wings while the trunk of the carcass is received between the two rods 80,82.

Back Skin Slitting Station

Figure 9:
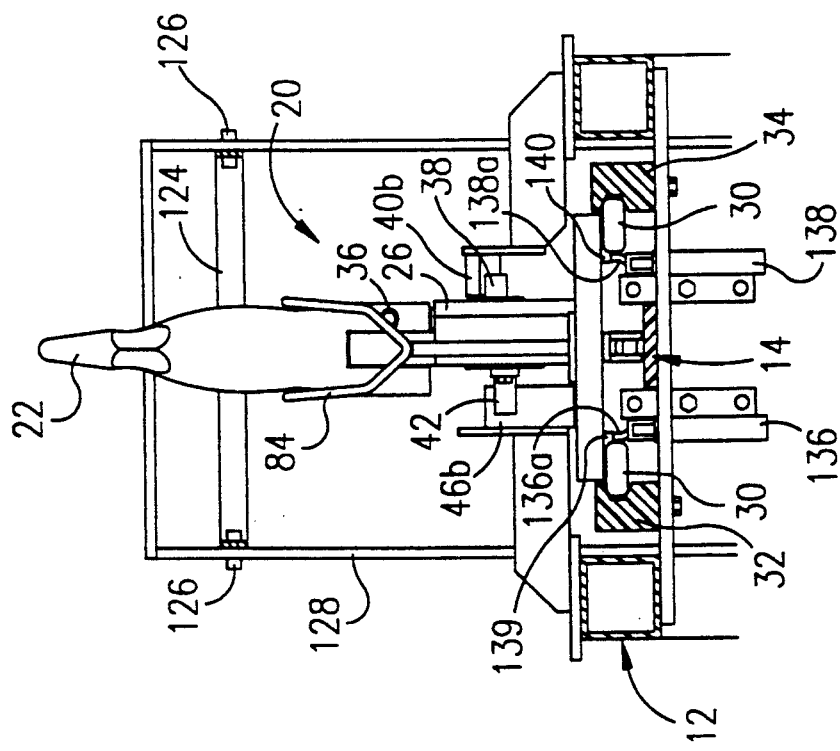
FIG. 9 is a fragmentary, vertical cross-sectional view through the machine just upstream from the back skin slitting station taken substantially along line 9—9 of FIG. 8.
Figure 6:
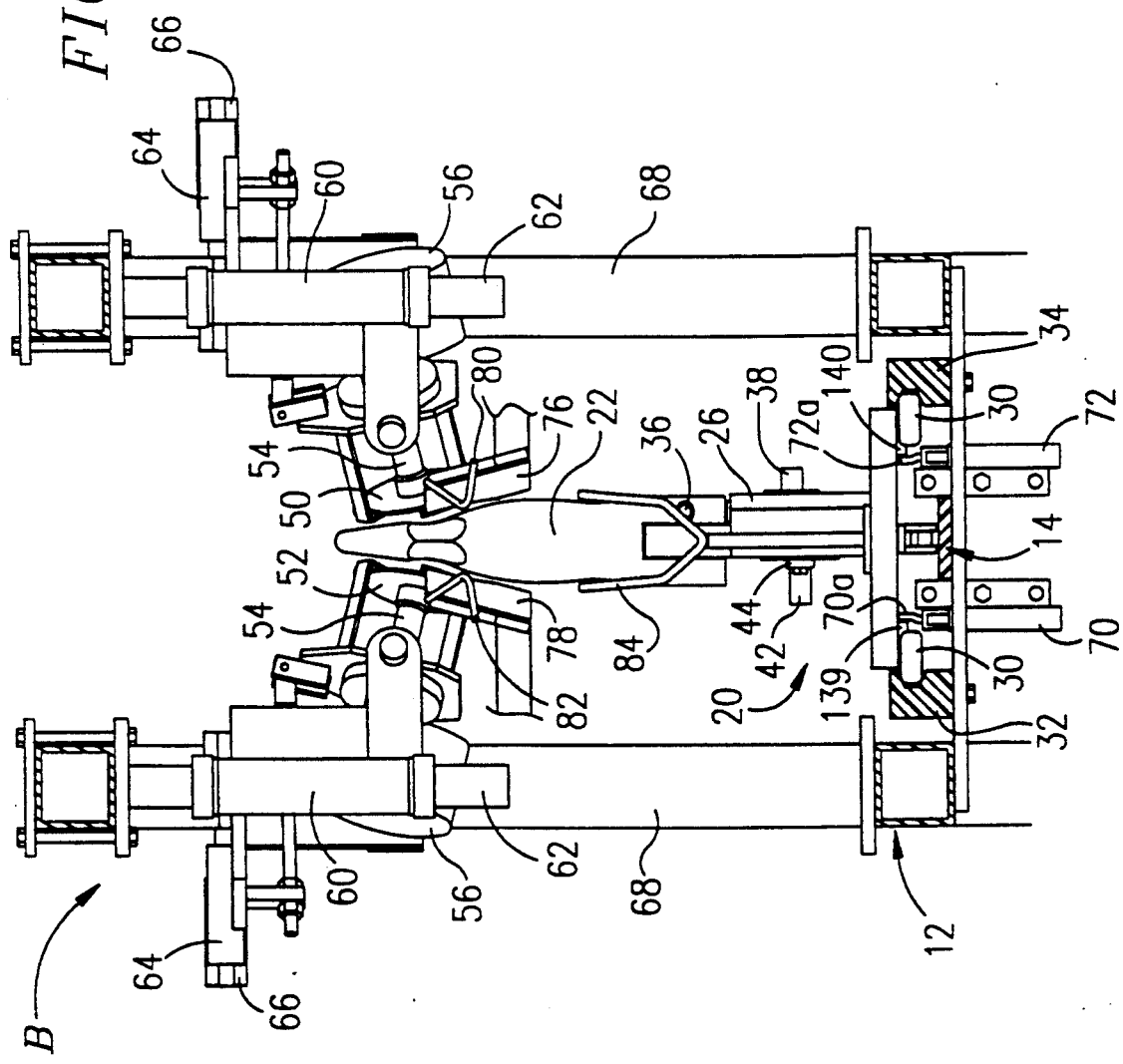
FIG. 6 is a fragmentary, cross-sectional view of the wing cutting station of the machine taken substantially along line 6—6 of FIG. 5 with the cutters located at their full inward positions.
Figure 7:
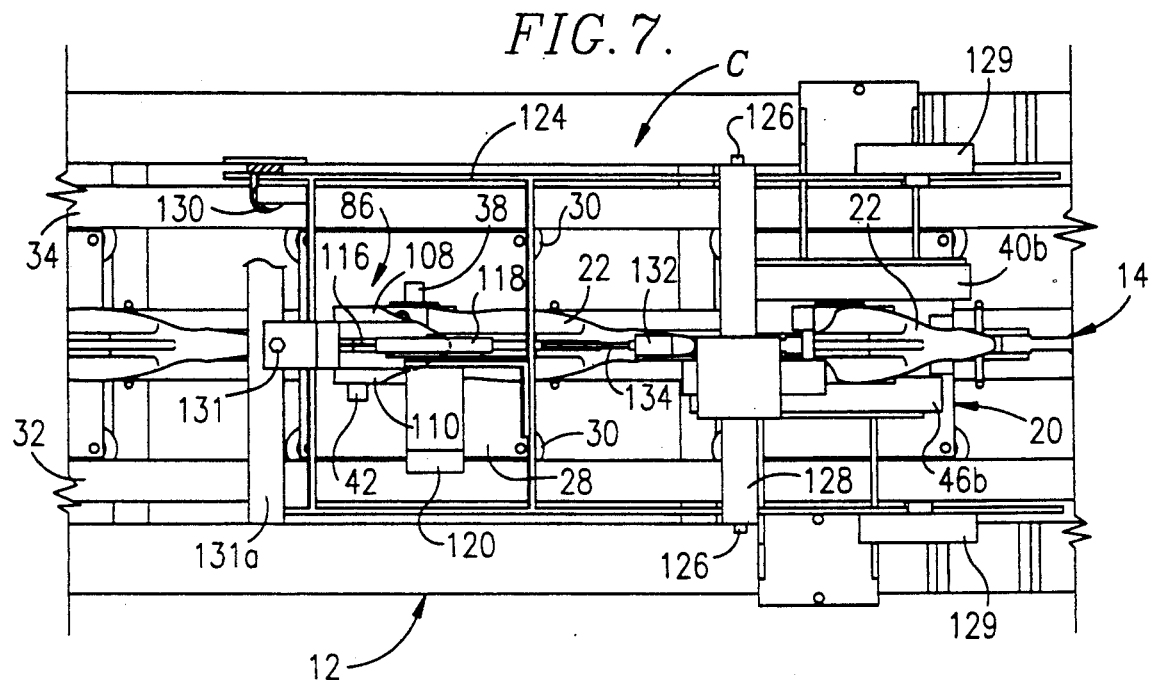
FIG. 7 is an enlarged, fragmentary top plan view of the back skin slitting station of the machine.
Figure 10:
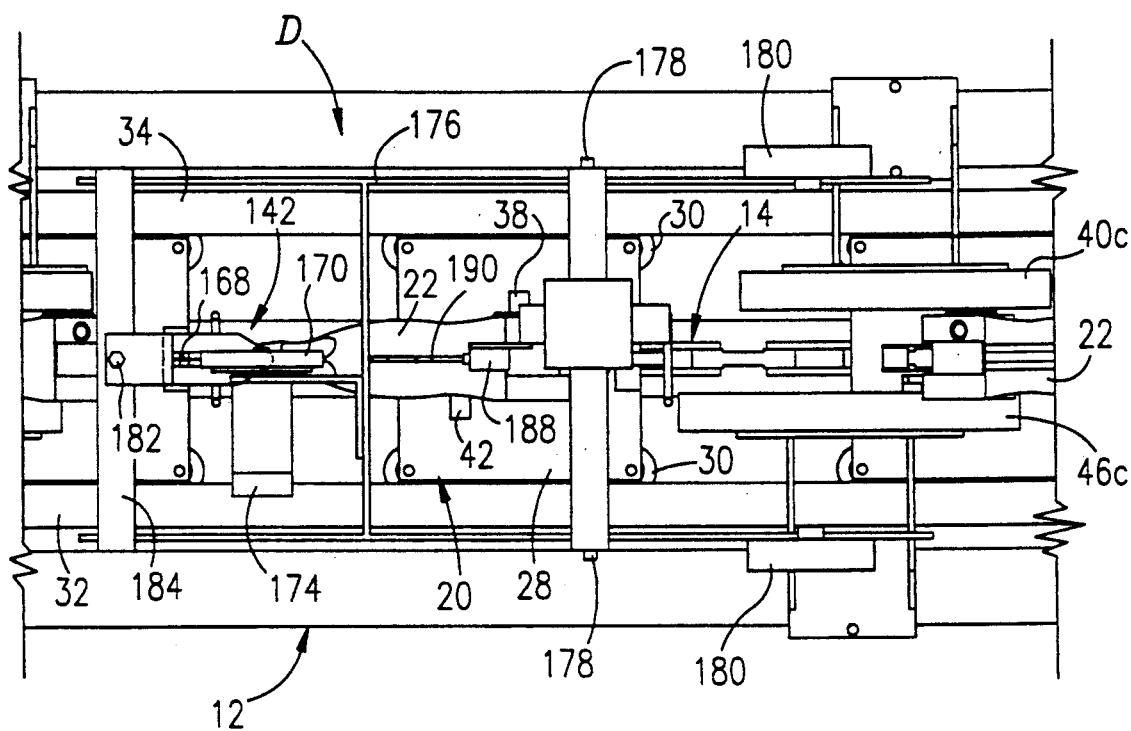
FIG. 10 is an enlarged, fragmentary top plan view of the breast skin slitting station of the machine.

As the carcass approaches the back skin slitting station C, the mandrel 22 is rocked back into a reclined position to place the carcass with its back facing upwardly and with its posterior end leading. An upstanding yoke 84 on the carrier plate 28 is disposed to receive the breast of the carcass at this time and assist in supporting the carcass during the back skin slitting operation. FIGS. 7, 8, and 9 are particularly helpful with respect to details of the back skin slitting station C.

At station C a special slitting nozzle 86 is supported above the path of travel of the mandrels 22 in line with the backbone of the approaching carcasses for slipping under the back skin and preparing a long slit in the back skin from the posterior region all along the backbone and to the neck portion of the carcass. As illustrated in particular detail in FIGS. 15, 16, and 17, the nozzle 86 comprises a generally flat, plate-like body having a rounded forwardmost tip 88 at which there is located a main air stream outlet port 90. The port 90 communicates with a fore-and-aft extending bore 92 which leads to the rear of the nozzle body and intersects at right angles with a vertical passage 93 leading downwardly to a transverse conduit 94 communicating with a source of pressurized air. In its preferred form, the tip of the nozzle 86 is also provided with a plurality of small branch ports 96,98,100 and 102 which communicate with the main fore-and-aft bore 92 via branch passageways 96a,98a,100a, and 102a, respectively.

The nozzle body 86 has a flat top surface 104 and a similarly flat bottom surface 106. A pair of side wings 108 and 110 are set back from the tip 88 and project outwardly from opposite side margins of the body. Leading edges of the wings 108,110 slope gradually rearwardly in a streamlined manner to intersect with outermost side edges of the wings, while the wings are angled downwardly at approximately 45° as their laterally outer extremities are approached.

Centrally located on the top surface 104 adjacent the rear of the latter is an upwardly and rearwardly inclined cam ramp 112 having a central slit 114 within which is located an upwardly and rearwardly inclined knife blade 116.

Directly overlying the nozzle 86, particularly the top surface 104 adjacent the tip 88, is a drive wheel 118 which makes substantially tangential contacting relationship with the nozzle 86. Drive wheel 118 is powered by a continuously operating hydraulic motor 120 for rotation in the direction indicated by the arrow 122 in FIG. 8. In its preferred form, the drive wheel 118 is constructed from a suitable synthetic resinous material such as Urethane.

Both the drive wheel 118 with its motor 120 and the nozzle assembly 86 are carried on a rockable frame 124 having transverse pivot connections 126 with upstanding support structure 128 on the frame of the machine. A counterweight 129 is supported on the rocking frame 124 on the far side of the pivot 126 relative to the nozzle 86 so as to effectively lighten the downforce exerted by the nozzle 86 due to its weight and the weight of the wheel 18 and motor 120. In the preferred form, the nozzle 86 is allowed to bear floatingly against the backbone of the carcass being processed at station C so that the nozzle 86 can rise and fall to the extent necessary to accommodate irregularities in the backbone of the carcass and to automatically adjust for different sized carcasses.

The combined weight of the nozzle 86, wheel 18 and motor 120 exceeds that of the counterweight 129 such that the frame 124 is biased in a counterclockwise direction about pivots 126 to the extent permitted by an adjustable stop 131 which comes to rest against a crossmember 131a spaced upwardly from the main frame of the machine (FIG. 8). If the mandrel 22 passing station C has a carcass mounted thereon, the frame 124 will remain in its lowered position so that the nozzle 86 will be properly aligned with the carcass for slitting the back skin. On the other hand, if the mandrel 22 passing through station C happens to be empty, a pneumatic cylinder 130 attached to the downstream end of the frame 124 will be extended to raise the frame to the FIG. 8 position, effectively elevating the nozzle 86 so that it does not rub against the bare mandrel 22.

Such actuation of the cylinder 130 is controlled by a stationary valve 132 situated at the upstream end of the station C and carried by the support structure 128. A feeler 134 of the valve 132 projects downwardly into the path of travel of the oncoming carcasses and is incapable of being actuated by one of the bare mandrels itself. Thus, if a mandrel is empty, the feeler 134 is not operated and the cylinder 130 remains extended to hold the nozzle 86 in its standby position of FIG. 8. However, if a carcass is present on the mandrel passing through station C, the carcass will engage and operate the feeler 134, releasing the air from cylinder 130 and allowing the frame 124 to float downwardly in a counterclockwise direction by gravity until the stop 131 rests against the member 131a and the nozzle 86 is in position for digging in under the back skin of the carcass. Once the carcass has passed the feeler 134, the valve 132 allows pressurized air to enter the cylinder 130 and to re-elevate the nozzle 86 to its standby position.

A pair of air control valves 136 and 138 that control the supply of pressurized air to the nozzle 86 are located underneath station C. The control valve 136 has a sensing feeler 136a disposed to be actuated by a depending projection 139 on the carriage plate 28. A similar feeler 138a (FIG. 9) on the valve 138 is disposed for actuation by a second depending projection 140 on the bottom of the carriage plate 28, spaced laterally from the projection 139. During the time the feelers 136a and 138a are engaged by the projections 139 and 140 respectively, air can be supplied to the nozzle 86 by the valves 136 and 138. On the other hand, when the feelers 136a and 138a are not engaged by the projections 139,140, the control valves 136 and 138 prevent air from being supplied to the nozzle 86.

The two control valves 136,138 are connected in a parallel flow relationship and the positions of their respective feelers 136a and 138a along the path of travel of the carrier plates 28 can be adjusted slightly using the adjusting screw 141 illustrated in FIG. 8. Thus, the timing of starting and stopping of the airflow from the two valves 136,138 can be varied somewhat, which also has an effect upon the volume of air that is produced at any one point in time.

In addition, the valve 132 is connected upstream from the two parallel-connected valves 136,138 in series flow relationship therewith so that unless the feeler 134 is operated by the presence of a carcass on an undermoving mandrel 22, no air is allowed to flow to the valves 136,138 from the valve 132. Consequently, actuation of the feelers 136a and 138a by projections 139 and 140 on an empty mandrel 22 will have no effect in turning on air to the nozzle 86.

Breast Skin Slitting Station

After the carcasses have been processed at station C in the reclined orientation with the back up, they are flipped over approximately 180° into a prone position with the breast up and the anterior end leading. In this orientation they pass through station D, as shown in detail in FIGS. 10 and 11. Supported at station D is a stationary slitting nozzle 142 which is virtually identical to the slitting nozzle 86, but without the side wings 108 and 110. As illustrated in FIG. 18, the nozzle 142 comprises an elongated flat body having a rounded tip 144 provided with a discharge outlet port 146. The port 146 communicates via an elongated, fore-and-aft internal bore 148 with a vertical passage 149 at the rear of the nozzle which in turn communicates with a lower, transverse conduit 150 coupled with a source of pressurized air. In its preferred form, the nozzle 142 is also provided with a plurality of auxiliary ports 152,154,156, and 158 in the tip 144 adjacent and on opposite sides of the main port 146, such ports 152-158 being connected with the main bore 148 via branch passages 152a,154a, 156a, and 158a. The nozzle body 142 has a flat top surface 160 and a similarly flat bottom surfaced 162.

Rising upwardly at an incline from the top surface 160 is an inclined cam ramp 164 having a central slit 166 within which is disposed a knife blade 168.

As illustrated in FIG. 11 the nozzle 142 is angled downwardly and upstream at a slightly steeper angle than the nozzle 86. This has been found especially appropriate for causing the tip 144 of the nozzle 142 to dig in under the loose skin surrounding the breast in the neck area whereby to facilitate subsequent entry and insertion of the entire nozzle 142 beneath the breast skin. A drive wheel 170 of identical construction to the drive wheel 118 overlies the tip 144 of the nozzle 142 centrally of the latter and makes substantially tangential engagement therewith to assist in forcing the skin to climb up onto the nozzle 142 during operation. The drive wheel 170 is rotated in a clockwise direction, as indicated by the arrow 172 in FIG. 11, and is powered by a continuously operating hydraulic motor 174.

The nozzle 142 and the drive wheel 170 with its motor 174 are carried by a rockable subframe 176 which pivots about transverse pivots 178 in the same manner as the rockable frame 124 associated with the back slitting station C. Like the frame 124, the frame 176 is provided with counterweights 180 on the upstream end thereof which effectively reduce the weight of the nozzle 142, wheel 170, and motor 174 and cause such structure to floatingly engage the carcasses moving by. The counterweights 180 are not sufficient to cause the subframe 176 to actually rotate in a clockwise direction about the pivots 178, the combined weight of the nozzle 142, the wheel 170 and the motor 174 being such as to cause the frame 176 to swing downwardly in a counterclockwise direction to the extent permitted by the adjustable stop 182 engaging against a transverse member 184 secured to and spaced above the main frame 12. Unlike the rockable frame 124 of station C, the frame 176 has no air cylinder to raise the nozzle 142 into a standby position. In the event an empty mandrel 22 passes through station D, nozzle 142 will not directly engage such mandrel even when nozzle 142 is fully lowered as in FIG. 11.

Air to the nozzle 142 is controlled by a valve 188 stationarily mounted above the path of travel of the carcasses as shown in FIG. 11. The valve 188 has a feeler 190 which projects down into the path of travel of the oncoming carcasses and thus serves to actuate the valve 188 and cause the pressurized air to issue from the nozzle 142 during the period that the feeler 190 is engaged by the carcass. As the carcass leaves engagement with the feeler 190, the air is turned off.

Peeling Station

Figure 14:
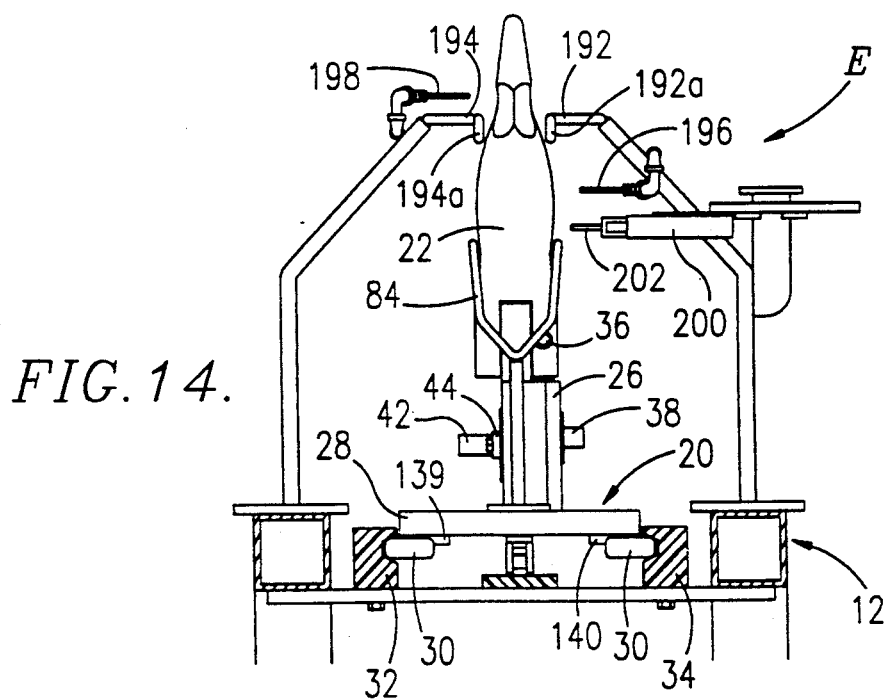
FIG. 14 is a transverse, cross-sectional view through the peeling station taken substantially along line 14—14 of FIG. 13.
Figure 13:
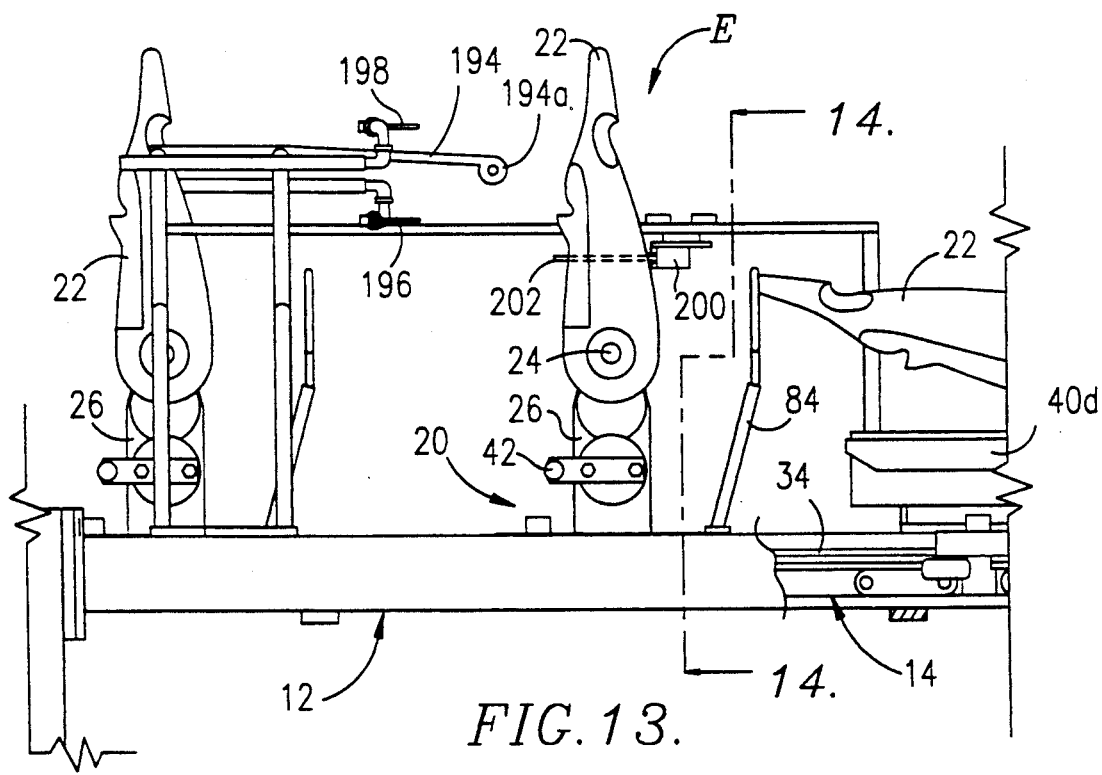
FIG. 13 is an enlarged, fragmentary side elevational view of the peeling station taken from the same side of the machine as illustrated in FIG. 1.

After the carcasses have passed through the breast skin slitting station and have been turned to an upright orientation, they pass through the peeling station E where the two halves of skin on opposite lateral sides of the carcass are pulled down to the leg area of the carcass. Such peeling action is primarily effected by a pair of peeling rods 192 and 194 disposed on opposite sides of the path of travel of the upright carcass. The rods 192 and 194 are disposed horizontally and converge in the upstream direction until the tips 192a and 194a are spaced apart a distance corresponding to the width of the carcass across the conveyor. As shown in FIGS. 13 and 14, the rods 192 and 194 are situated below the top end of the mandrel 22 so as to intersect the carcasses generally midway between their upper and lower ends. Blasts of air issuing from nozzles 196 and 198 outboard of the rods 192,194 but directed in the upstream direction cause the loose skin halves on opposite sides of the bird to open sufficiently in the area of contact of the carcass by the rod tips 192a and 194a as to permit the rod tips 192a and 194a to slip under the loose skin halves. Although the skin may still be attached to the shoulder and neck areas of the carcass as well as in the leg areas, as the carcass moves downstream and the rods 192 and 194 diverge, the skin halves are lifted in a tenting-like move to progressively pull the skin halves away from the flesh up toward the neck and down toward the legs until the skin is torn entirely free and simply falls down over the leg areas. Thereafter, at station F, the loose skin may be grasped manually by an operator and pulled down over the legs to remove the leg skin as well and completely separate all skin from the carcass.

Air to the nozzles 196 and 198 is controlled by a control valve 200 situated alongside the conveyor 14. A sensing feeler 202 of the valve 200 projects inwardly into the path of travel of the advancing carcasses so that as each carcass engages and actuates the feeler 202, the air to the nozzles 196,198 is turned on. As each carcass leaves the feeler 202 and permits it to return to its original position, the air is turned off.

Manual Peeling Station and Carcass Discharge

As explained above, after the carcass has left station E, the two halves of skin will be hanging down from opposite sides of the carcass in the area of the legs, but the skin covering the legs will still be intact. Therefore, at station F either a suitable mechanical apparatus may be provided to complete the final skin removal, or an operator may grasp the two halves of loose skin and pull the skin completely off the carcass, including the remaining skin that covers the legs. If desired, one operator may be stationed on each side of the machine so that each operator effectively pulls only one half of the skin. Depending upon the line speed of the machine, it may or may not be necessary to lengthen the machine in the area of station F to permit the use of additional operators for the final skin peeling step.

At station G, after all the skin has been completely removed from the carcass, the mandrels 22 continue in a horizontal mode while an upwardly and rearwardly inclined discharge ramp 204 (FIGS. 1 and 2b) engages the carcass and effectively cams it upwardly off the mandrel as the mandrel then moves on around the sprocket 16 and down to the lower return stretch of the conveyor. The freed carcass may then gravitate into an awaiting container or onto other conveyor systems for further processing.

Operation

The operation of the machine 10 should be apparent from the foregoing description. However, further clarification may be obtained by referring also to FIGS. 19–20 which show carcasses undergoing operations at slitting stations C and D and peeling station E.

After a carcass has had its wings removed at station B, the mandrel 22 is cammed back into a reclining position by the cam 46b (FIG. 1) so that the wingless carcass, denoted by the numeral 206 in FIGS. 19–23, approaches station C with its back 208 up and its posterior end 210 leading. Prior to being placed on the mandrel 22, the carcass 206 has had its tail severed and removed so that a small notch 212 (FIG. 19) is presented in the back skin 214 at the posterior end 210. Such notch 212 exposes the meat 216 therebeneath and facilitates insertion of the slitting nozzle 86 under the back skin 214.

As the carcass 206 approaches the nozzle 86 and reaches the approximate position of FIG. 19, the air to nozzle 86 is turned on so that strong jets of air issue from the ports 90 and 96–102 of nozzle 86. These jets of air are directed at the posterior end 210 of the carcass 206 and particularly at the notch 212 to billow out the back skin 214 and facilitate insertion of the nozzle tip 88 under the back skin 214 directly overlying the backbone of the carcass 206 as illustrated in FIGS. 20 and 21. The continued presence of the air jets once the nozzle 86 has slipped under the back skin 214 continues to loosen and billow out the back skin to facilitate slitting once the nozzle is fully under the skin.

As also shown particulary well in FIGS. 20 and 21, the drive wheel 118 is instrumental in forcing the back skin to climb up onto the nozzle 86 as tip 88 slips under the back skin 214. The extra assistance of the wheel 118 is particularly beneficial because the back skin 214 in the area of the posterior end 210 tends to be tightly secured to the underlying meat 216 and resists efforts by the nozzle tip 88 and the air jets alone to loosen the back skin 214 sufficiently to permit nozzle 86 to be slipped thereunder.

As the carcass 206 advances leftwardly viewing FIGS. 19 and 20, the back skin 214 rides up the camming ramp 112 of the nozzle 86 until it encounters the knife blade 116, which slits the back skin 214. The slit produced by the knife 116 extends along the full length of the backbone of the carcass from the posterior end 210 to the anterior end 216 and the back skin 214 is loosened along opposite sides of the slit. Helpful in this regard are the wings 108 and 110 of the nozzle 86 which slip between the back skin 214 and the underlying meat 216 and mechanically assist the air jets in loosening the back skin 214 from the meat 216. Note also that as the carcass 206 moves through station C, the nozzle 86 rides floatingly up along the backbone to the extent necessary to accommodate the changes in contour of the carcass 206 in that area. By the time the slit through the back skin 214 is complete, the air jets issuing from nozzle 86 have been turned off.

As shown in FIG. 1, after the carcass 206 has left station C, its mandrel 22 is cammed by the cam means 46c through a generally 180° arc that reorients the carcass 206 with its breast 218 up and its anterior end 216 leading (as shown in FIG. 22). In this orientation, the carcass 206 passes through station D wherein the breast skin 220 is slit along the entire length thereof. As the carcass 206 approaches the nozzle 142, the air is turned on so that air jets issue from port 146 and ports 152-158 to billow out and inflate the breast skin 220 in the anterior area sufficiently to permit the tip 144 of nozzle 142 to slip under the breast skin 220. The drive wheel 170 engages the exterior of the breast skin 220 as nozzle tip 144 slips thereunder and drives the breast skin 220 more fully up onto the top surface of the nozzle 142 to assure that the nozzle 142 is in proper position. As leftward movement of the carcass 206 continues, the breast skin 220 rides up the cam ramp 164 and is slit by the knife 168, whereupon the carcass 206 leaves station D and the air jets are shut off.

Upon exiting station D, the mandrel 22 of the carcass 206 is reoriented into an upright position by the action of cam means 46d (FIG. 1). Thus, as shown in FIG. 23, the carcass 206 is fully upright as it approaches and moves through peeling station E, with anterior end 216 up and back 208 leading. Because of the slits which have been made in the back skin 214 and the breast skin 220, the skin on the main trunk of the carcass is in effect divided into two half sheets bounded along opposite fore-and-aft extremities relative to the path of conveyor travel by the slits. One of such half sheets has been denoted by the numeral 222 in FIG. 23. At the time of entering station E, the skin half sheet 222 remains connected to the carcass 206 adjacent the anterior end 216 in the region surrounding the wing cut as denoted by the numeral 224, and also in the region covering the lower portion of the trunk and the legs 226.

The horizontal peeling rods 192 and 194 are disposed at such a height that they intersect the carcass 206 approximately midway between the posterior and anterior ends 210,216. As the rod tips 192a and 194a engage the carcass 206 at the back 208, they slip under the two half sheets of skin and progressively force their way rearwardly until exiting at the opposite breast side 218 of the carcass 206 as illustrated in FIG. 23. Continued leftward movement of the carcass 206 viewing FIG. 23 causes the laterally diverging rods 192 and 194 to progressively pull the skin halves 222 outwardly into a tent-like configuration until the skin pulls free from the carcass in the wing cut region 224 and is loose down to the area of the legs 226 The two skin halves 222 drape down over the legs 226 at this time, whereupon they can be completely removed at the finishing station F. Air from the nozzles 196 and 198 billows out the skin halves 222 as the carcass 206 approaches rod tips 192a and 194a to facilitate proper entry of peeling rods 192 and 194 underneath the skin halves 222.

Following manual or mechanical removal of the skin from the legs 226 at the finishing station F, the skinfree carcasses are ready for discharge at station G and subsequent processing.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. In a method of removing the skin from a poultry carcass, the improvement comprising:
   removing the tail and wings from the carcass;
   directing an air stream under the back skin of the carcass and slitting the back skin along the backbone;
   directing an airstream under the breast skin of the carcass and slitting the breast skin in a longitudinal direction along the breast to present two opposite half sheets of skin on the carcass bounded by the slits along the backbone and breast of the carcass; and
   peeling the two half sheets of skin away from the carcass generally toward the thighs of the carcass to expose the meat therebeneath.

2. In a method of removing the skin from a poultry carcass, as claimed in claim 1,
   said directing, slitting and peeling steps being carried out while the carcass is advancing along a predetermined path of travel with other poultry carcasses in succession.

3. In a method of removing the skin from a poultry carcass, as claimed in claim 2,
   said directing and slitting steps with respect to the back skin being carried out by a first stationary air nozzle and a first stationary knife,
   said directing and slitting steps with respect to the breast skin being carried out by a second stationary air nozzle and a second stationary knife,
   said peeling step being carried out by the application of stationary peeling surfaces engaging the carcass on opposite sides of its path of travel.

4. In a method of removing the skin from a poultry carcass, as claimed in claim 2,
   said directing step with respect to the back skin including forcing a stationary air nozzle under the back skin while the carcass moves generally toward the nozzle and engaging the outside of the back skin near the nozzle with a rotary drive wheel turning in such a direction as to drive the back skin up onto the nozzle as the nozzle slips under the skin.

5. In a method of removing the skin from a poultry carcass, as claimed in claim 4,
said slitting step with respect to the back skin including forcing the back skin upwardly away from the backbone with stationary cam means near the nozzle and downstream from the rotary drive wheel as the carcass moves generally toward and past the nozzle and slitting the back skin with a stationary knife while the back skin is cammed away from the backbone.

6. In a method of removing the skin from a poultry carcass, as claimed in claim 2,
said directing step with respect to the breast skin including forcing a stationary air nozzle under the breast skin while the carcass moves generally toward the nozzle and engaging the outside of the breast skin near the nozzle with a rotary drive wheel turning in such a direction as to drive the breast skin up onto the nozzle as the nozzle slips under the skin.

7. In a method of removing the skin from a poultry carcass, as claimed in claim 5,
said slitting step with respect to the breast skin including forcing the breast skin upwardly away from the breast with stationary cam means near the nozzle and downstream from the rotary drive wheel as the carcass moves generally toward and past the nozzle and slitting the breast skin with a stationary knife while the breast skin is cammed away from the breast.

8. In a method of removing skin from a poultry carcass that includes the step of forcing an air nozzle under the skin of the carcass between the meat and the skin, the improvement comprising the additional step of engaging the outside of the skin adjacent the nozzle with a rotary drive wheel rotating in such a direction as to cooperatively drive the skin up onto the nozzle as the nozzle slips under the skin.

9. In a method of removing skin from a poultry carcass, as claimed in claim 8,
and the additional step of slitting the skin with a knife while the nozzle is under the skin and the skin is inflated by an airstream issuing from the nozzle.

10. In a method of removing skin from a poultry carcass, as claimed in claim 9,
said slitting step including forcing the skin away from the meat with cam means to assist in positioning the skin for slitting engagement with the knife.

11. In a method of processing poultry carcasses that includes the steps of advancing the carcasses in succession along a predetermined path of travel and passing each carcass through a pair of laterally spaced cutters positioned on opposite sides of the path of travel for severing the wings from the carcass, the improvement comprising:
initially positioning the cutters at relatively inwardly disposed locations as wing severance is commenced and then shifting the cutters toward slightly further outwardly spaced locations as wing severance is completed, whereby to avoid deep cuts into the breast of the carcass as the carcass moves past the cutters.

12. In a method of processing poultry carcasses, as claimed in claim 11,
said positioning and shifting steps including swinging the cutters between their inwardly and outwardly disposed locations.

13. In a method of processing poultry carcasses, as claimed in claim 12,
the cutters being swung to their outwardly disposed locations during severing engagement of the cutters with the carcass and the cutters being returned to their inwardly disposed locations following severing engagement of the cutters with the carcass.

14. In a method of removing the skin from poultry carcasses, the improvement comprising:
advancing carcasses having their wings and tails removed along a predetermined path of travel in succession;
with respect to each carcass
forcing a first stationary air nozzle under the back skin of the carcass and along the backbone as the carcass advances whereby to loosen the back skin;
inserting a first stationary knife under the loosened back skin along the backbone as the carcass advances to slit the back skin along the backbone;
forcing a second stationary air nozzle under the breast skin of the carcass and along the breast bone as the carcass advances whereby to loosen the breast skin;
inserting a second stationary knife under the loosened breast skin along the breast bone as the carcass advances whereby to slit the breast skin and present two opposite half sheets of skin on the carcass each bounded by the slits along the backbone and breast bone; and
applying stationary peeling rods to the carcass on opposite sides of its path of travel in a manner to peel the two half sheets of skin away from the carcass generally toward the thighs of the carcass to expose the meat therebeneath.

15. In a method of removing the skin from poultry carcasses as claimed in claim 14,
said first stationary air nozzle and said first stationary knife being disposed in close proximity to one another for essentially simultaneously loosening and slitting the back skin along the backbone.

16. In a method of removing the skin from poultry carcasses as claimed in claim 14,
said second stationary air nozzle and said second stationary knife being disposed in close proximity to one another for essentially simultaneously loosening and slitting the breast skin along the breast bone.

17. In a method of removing the skin from poultry carcasses as claimed in claim 14,
said first stationary air nozzle and said first stationary knife being disposed in close proximity to one another for essentially simultaneously loosening and slitting the back skin along the backbone,
said second stationary air nozzle and said second stationary knife being disposed in close proximity to one another for essentially simultaneously loosening and slitting the breast skin along the breast bone,
said second stationary air nozzle and said second stationary knife being disposed downstream from said first stationary air nozzle and said first stationary knife with respect to the direction of travel of the carcasses.

18. In a method of removing the skin from poultry carcasses as claimed in claim 14,
said slitting of the back skin and said slitting of the breast skin being carried out in mutually spaced relation to one another along the path of travel of the carcasses.

19. In a method of removing the skin from poultry carcasses as claimed in claim 18,
said slitting of the breast skin being carried out in downstream relation to the slitting of the back skin with respect to the path of travel of the carcasses.

20. In a method of removing the skin from poultry carcasses as claimed in claim 14,
the wings of the carcasses being removed while the carcasses are advancing along said predetermined path of travel by cutters positioned on opposite sides of the path of travel.

21. In a method of removing the skin from poultry carcasses as claimed in claim 20,
said wing cutting step being carried out by initially positioning the cutters at relatively inwardly disposed locations as wing severance is commenced and then shifting the cutters toward slightly further outwardly spaced locations as wing severance is completed, whereby to avoid deep cuts into the breast of the carcass as the latter moves past the cutters.

22. In a method of removing the skin from poultry carcasses, as claimed in claim 17,
each carcass having a head end and a tail end,
each carcass moving past said first nozzle and said first knife with said tail end leading,
each carcass being rotated 180° following movement past said first nozzle and said first knife to place its head end in a leading position,
each carcass moving past said second nozzle and said second knife with said head end leading.

23. In apparatus for use in removing the skin from a poultry carcass, the improvement comprising:
an air nozzle adapted to be inserted under the skin of the carcass for directing a stream of air between the skin and the meat to loosen the skin;
a rotary drive wheel closely adjacent said nozzle in position to engage the outside of the skin as the nozzle slips under the latter,
said drive wheel being rotated in such a direction as to drive the skin up onto the nozzle during insertion of the latter under the skin; and
a knife adjacent said nozzle for slitting the skin while the latter is loosened and inflated by the stream of air from the nozzle.

24. In apparatus for use in removing the skin from a poultry carcass, as claimed in claim 23,
said nozzle comprising an elongated, generally flat body having a pointed tip provided with an outlet port for issuing an airstream from the body,
said body further including a generally flat top surface disposed to immediately underlie the skin when the nozzle is inserted under the skin and a generally flat bottom surface disposed to immediately overlie the meat when the nozzle is inserted under the skin,
said drive wheel being in substantial tangent relationship with said upper surface of the body at a point spaced slightly behind said outlet port.

25. In apparatus for use in removing the skin from a poultry carcass, as claimed in claim 24,
said knife being spaced from said point of tangency generally in line with said outlet port and said point of tangency and having a cutting edge projecting upwardly away from said upper surface of the body,
said upper surface of the body having ramp between the point of tangency and the cutting edge for camming the skin toward the knife as the nozzle body is progressively forced under the skin.

26. In apparatus for use in removing the skin from a poultry carcass, as claimed in claim 24,
said nozzle body having a pair of laterally outwardly projecting wings set back from the tip of the body and disposed on opposite lateral sides of the body,
said wings being slightly downturned to follow the contour of the carcass and assist in loosening the skin from the meat of the carcass.

27. In apparatus for use in removing the skin from a poultry carcass, as claimed in claim 26,
each of said wings having rounded forwardmost edges for streamlined movement beneath the skin.

28. In apparatus for severing both wings from poultry, carcasses as the carcasses are advanced in succession along a predetermined path of travel, the improvement comprising:
a pair of rotary cutting discs positioned on opposite sides of the path of travel and angled inwardly with respect to said path of travel to present arcuate cutting edges aligned with respective shoulder joints between the breast and wings of the carcass;
means mounting said cutting discs for shifting movement between inwardly disposed positions and slightly further outwardly disposed positions with respect to said path of travel; and
means for retaining the discs in their inwardly disposed positions during commencement of wing severance and shifting the discs to their outwardly disposed positions before completion of wing severance whereby to avoid deep cuts into the breasts of the carcass as the carcass moves past the cutting discs.

29. In apparatus for severing both wings from poultry carcasses, as claimed in claim 28,
said mounting means including pivots for causing said shifting movement of the discs to be carried out in a swinging motion.

30. In apparatus for severing both wings from poultry carcasses, as claimed in claim 28,
said means for retaining and shifting the cutting discs including power means operably coupled with the cutting discs, sensor means for detecting the position of the carcasses along the said path of travel, and control means operably interconnecting said sensor means and said power means for operating the power means in response to actuation of the sensor means.

31. In apparatus for removing the skin from poultry carcasses, the improvement comprising:
means for conveying a plurality of carcasses in succession along a predetermined path of travel;
a back skin slitting station positioned on said path of travel and including a first stationary air nozzle disposed to be forced under the back skin of each successive carcass along the backbone to loosen the back skin from the meat,
said back skin slitting station further including a first stationary knife disposed to slit the loosened back skin of each successive carcass along the backbone as the carcass advances;
a breast skin slitting station positioned on said path of travel in spaced relation to said back skin slitting station and including a second stationary air nozzle disposed to be forced under the breast skin of each successive carcass and along the breast bone to loosen the breast skin from the meat, said breast skin slitting station further including a second stationary knife disposed to slit the loosened breast skin of each successive carcass as the carcass advances and present two opposite half sheets of skin on the carcass bounded by the slits along the backbone and breast; and a peeling station including stationary peeling rods located on opposite sides of the path of travel of the carcasses in disposition for insertion between the half sheets of skin and the meat in a manner to peel the sheets of skin away from the carcass generally toward the thighs of the carcass to expose the meat.

32. In apparatus for removing the skin from poultry carcasses, as claimed in claim 31, said breast skin slitting station being positioned in downstream relation to the back skin slitting station.

33. In apparatus for removing the skin from poultry carcasses, as claimed in claim 31, each of said carcasses having a tail end and a head end, said conveying means including structure supporting each carcass for movement past the back skin slitting station with said tail end of the carcass leading, for then reorienting each carcass with the head end of the carcass leading, and for then supporting each carcass for movement past the breast skin slitting station with the head end of the carcass leading.

34. In apparatus for removing the skin from poultry carcasses, as claimed in claim 33, said structure including an elongated mandrel adapted for insertion into the hollow body cavity of each carcass for supporting the carcass, said structure further including means for pivoting each mandrel between and holding each mandrel at a laid back position for movement past the back skin slitting position, a laid forward position 180° rotated from the laid back position for movement past the breast skin slitting position, and an upright position rotated 90° from the laid back and laid forward positions for movement past the peeling station.

35. In apparatus for removing the skin from poultry carcasses, as claimed in claim 34, said back skin slitting station further including a rotary drive wheel closely adjacent said first nozzle in position to engage the outside of the back skin as the first nozzle slips under the back skin, said drive wheel being rotated in such a direction as to drive the back skin up onto the first nozzle during insertion of the latter under the back skin.

36. In apparatus for removing the skin from poultry carcasses, as claimed in claim 35, said first nozzle comprising an elongated, generally flat, generally horizontally disposed body having a pointed tip facing in a direction opposite to the direction of movement of the carcasses along said path of travel and provided with an outlet port for issuing an airstream from the body, said body further including a generally flat top surface disposed to immediately underlie the back skin when the first nozzle is inserted under the back skin and a generally flat bottom surface disposed to immediately overlie the meat when the first nozzle is inserted under the back skin, said drive wheel being in substantial tangent relationship with said upper surface of the body at a point spaced slightly behind said outlet port.

37. In apparatus for removing the skin from poultry carcasses, as claimed in claim 36, said first knife being spaced from said point of tangency generally in line with said outlet port and said point of tangency and having a cutting edge projecting upwardly away from said upper surface of the body, said upper surface of the body having an inclined ramp between the point of tangency and the cutting edge for camming the skin toward the knife as the nozzle body is progressively forced under the back skin.

38. In apparatus for removing the skin from poultry carcasses, as claimed in claim 37, said nozzle body having a pair of laterally outwardly projecting wings set back from the tip of the body and disposed on opposite lateral sides of the body, said wings being slightly downturned to follow the contour of the carcass and assist in loosening the back skin from the meat of the carcass.

39. In apparatus for removing the skin from poultry carcasses, as claimed in claim 38, each of said wings having rounded forwardmost edges for streamlined movement beneath the back skin.

40. In apparatus for removing the skin from poultry carcasses, as claimed in claim 34, said breast skin slitting station further including a rotary drive wheel closely adjacent said second nozzle in position to engage the outside of the breast skin as the second nozzle slips under the breast skin, said drive wheel being rotated in such a direction as to drive the breast skin up onto the second nozzle during insertion of the latter under the breast skin.

41. In apparatus for removing the skin from poultry carcasses, as claimed in claim 40, said second nozzle comprising an elongated, generally flat, generally horizontally disposed body having a pointed tip facing in a direction opposite to the direction of movement of the carcasses along said path of travel and provided with an outlet port for issuing an airstream from the body, said body further including a generally flat top surface disposed to immediately underlie the breast skin when the second nozzle is inserted under the breast skin and a generally flat bottom surface disposed to immediately overlie the meat when the second nozzle is inserted under the breast skin, said drive wheel being in substantial tangent relationship with said upper surface of the body at a point spaced slightly behind said outlet port.

42. In apparatus for removing the skin from poultry carcasses, as claimed in claim 41, said second knife being spaced from said point of tangency generally in line with said outlet port and said point of tangency and having a cutting edge projecting upwardly away from said upper surface of the body, said upper surface of the body having an inclined ramp between the point of tangency and the cutting edge for camming the breast skin toward the knife as the nozzle body is progressively forced under the breast skin.

43. In apparatus for removing the skin from poultry carcasses, as claimed in claim 34, said peeling rods being generally horizontally disposed and diverging symmetrically from the path of travel and one another with respect to the direction of movement of the carcasses along said path of travel.

* * * * *